(12) United States Patent
Ioffe et al.

(10) Patent No.: US 12,101,180 B2
(45) Date of Patent: Sep. 24, 2024

(54) SYSTEMS AND METHODS FOR HIGH POWER OPERATION IN USER EQUIPMENT

(71) Applicant: Apple Inc., Cupertino, CA (US)

(72) Inventors: Anatoliy Sergey Ioffe, Redwood City, CA (US); Elmar Wagner, Taufkirchen (DE); Fucheng Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/503,039

(22) Filed: Oct. 15, 2021

(65) Prior Publication Data
US 2022/0360362 A1    Nov. 10, 2022

Related U.S. Application Data

(60) Provisional application No. 63/185,099, filed on May 6, 2021.

(51) Int. Cl.
*H04L 1/00* (2006.01)
*H04L 5/14* (2006.01)
*H04L 5/16* (2006.01)

(52) U.S. Cl.
CPC .......... *H04L 1/0025* (2013.01); *H04L 5/1469* (2013.01); *H04L 5/16* (2013.01)

(58) Field of Classification Search
CPC ............ H04L 1/1812; H04L 5/14; H04L 5/16
See application file for complete search history.

(56) References Cited

U.S. PATENT DOCUMENTS

| | | | | |
|---|---|---|---|---|
| 8,982,755 | B1 * | 3/2015 | Shah | H04L 1/1896 370/311 |
| 2006/0229032 | A1 * | 10/2006 | Ninomiya | G06K 7/0008 340/572.1 |
| 2016/0337107 | A1 * | 11/2016 | Tabet | H04L 5/16 |
| 2018/0124705 | A1 * | 5/2018 | Su | H04W 52/0277 |
| 2019/0363843 | A1 * | 11/2019 | Gordaychik | H04L 1/08 |

(Continued)

OTHER PUBLICATIONS

Apple Inc., "Half duplex operation for PC2 FDD bands", 3GPP RAN WG4 Meeting #99-e, May 19-27, 2021, 4 pages.

(Continued)

*Primary Examiner* — Mansour Oveissi
*Assistant Examiner* — David M Oveissi
(74) *Attorney, Agent, or Firm* — FLETCHER YODER PC

(57) ABSTRACT

This disclosure is generally directed to systems and methods for high power operation in user equipment. The user equipment may indicate to a network high power capability of the user equipment. Based on an uplink signal strength of the user equipment, the network may send a command to the user equipment to transmit using the high power user equipment (HPUE) operation in half-duplex frequency division duplex (HD-FDD) mode. The network may also send a signal for the user equipment to return to a default power mode based on the uplink signal strength. The user equipment may then reconfigure to the default power in full-duplex frequency division duplex (FD-FDD) mode. The user equipment may also send an indication of an uplink duty cycle which indicates the ratio of uplink allocations corresponding to uplink transmissions relative to total uplink and downlink allocations.

20 Claims, 12 Drawing Sheets

(56) References Cited

U.S. PATENT DOCUMENTS

2019/0387409 A1* 12/2019 Thangarasa ........... H04W 16/00
2022/0303914 A1*  9/2022 Abdel Shahid ..... H04W 52/267

OTHER PUBLICATIONS

China Unicom, "New SID: Study on high power UE (power class 2) for one NR FDD band", 3GPP TSG-RAN Meeting #90e, Dec. 7-11, 2020, 3 pages.
China Unicom, "WF on PC2 for NR FDD band", 3GPP TSG-RAN WG4 Meeting #98e, Jan. 25-Feb. 5, 2021, 5 pages.
China Unicom, "WF on PC2 for NR FDD band", 3GPP TSG-RAN WG4 Meeting #98-bis-e, Apr. 12-20, 2021, 4 pages.
Apple Inc., "Views on HPUE for NR FDD bands", 3GPP RAN WG4 Meeting #98-e, Jan. 25-Feb. 5, 2021, 4 pages.
Nokia, Ericsson, "Revised WID on support of reduced capability NR devices", 3GPP TSG RAN Meeting #91e, Mar. 22-26, 2021, 6 pages.

* cited by examiner

SYSTEMS AND METHODS FOR HIGH POWER OPERATION IN USER EQUIPMENT

CROSS-REFERENCE TO RELATED APPLICATIONS

This application claims the benefit of U.S. Provisional Application No. 63/185,099, filed May 6, 2021, entitled, "SYSTEMS AND METHODS FOR HIGH POWER OPERATION IN USER EQUIPMENT," which is incorporated by reference in its entirety for all purposes.

BACKGROUND

The present disclosure relates generally to wireless communication, and specifically to user equipment using high power transmission.

A transmitter and a receiver of an electronic device may each be coupled to one or more antennas to enable the electronic device to respectively transmit and receive wireless signals. The electronic device may include a duplexer that isolates the transmitter from received signals of a first frequency range, and isolates the receiver from transmission signals of a second frequency range. In this manner, interference between the transmission and received signals may be reduced when communicating using the electronic device. However, this isolation may be negatively impacted when the electronic device implements high power transmission. That is, transmitting signals using high power may result in unwanted emissions outside of the allocated transmission channel (e.g., into an allocated reception channel) that may interfere with reception. Moreover, the duplexer may experience thermal degradation effects as a result of the high power transmissions.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a base station includes a transmitter to transmit data and a receiver to receive data. The base station may receive an indication from user equipment indicating that the user equipment is capable of transmitting using a high power. The base station may then determine that the user equipment signal strength is below a threshold value. The transmitter of the base station, based on determining the signal strength is below the threshold value, may send an indication to the user equipment to transmit data using the high power in a half-duplex frequency division duplex (HD-FDD) mode.

In another embodiment, user equipment includes a transmitter to transmit data and a receiver to receive data. The user equipment may send a notification to a network that the user equipment is capable of transmitting data using high power above a threshold value. The user equipment may then receive an indication from the network to transmit using the high power in a half-duplex frequency division duplex (HD-FDD) mode. The receiver of the user equipment may receive an indication from the network to transmit using a default power below the threshold value in a full-duplex frequency division duplex (FD-FDD) mode, and the user equipment may cause the transmitter to transmit a second set of data using the default power in the FD-FDD mode.

In yet another embodiment, a method includes sending, from user equipment, a notification to a network that the user equipment is capable of transmitting data using high power above a threshold value. The user equipment may then receive an indication from the network to transmit using the high power in a half-duplex frequency division duplex (HD-FDD) mode. The user equipment may transmit first data using the high power in the HD-FDD mode, receive an indication from the network to transmit using a default mode below the threshold value in a full-duplex frequency division duplex (FD-FDD) mode, and transmit second data using the FD-FDD mode.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
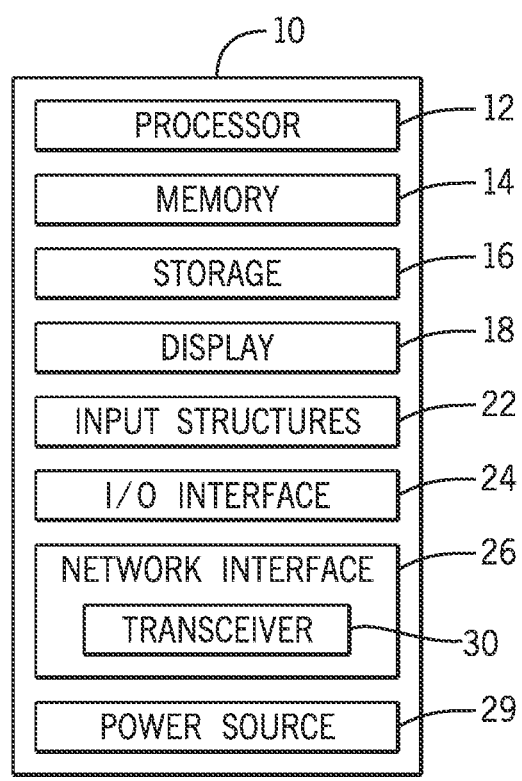
FIG. 1 is a block diagram of an electronic device, according to an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the term "approximately," "near," "about", and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

This disclosure is directed to user equipment (UE) performing uplink (UL) transmissions using high power user equipment (HPUE) operation. In some embodiments, the HPUE operation may correspond to power class 2 as defined by the 3GPP (3rd Generation Partnership Project), an organization that develops cellular communication standards. Specifically, power class 2 may refer to a transmit power level greater than 23 decibel-milliwatts (dBm). This is in contrast to 3GPP standards for default power operation (e.g., power class 3), which may refer to a maximum transmit power level of less than or equal to 23 dBm. While the greater transmission power of the HPUE operation may lead to greater transmission range, the user equipment may also realize increased temperature during transmission. This increased temperature may lead to component and/or performance degradation in the user equipment. For example, a duplexer that isolates a transmitter of the user equipment from received signals of a first frequency range, and isolates a receiver of the user equipment from transmission signals of a second frequency range, may degrade due to the higher temperature, resulting in frequency-shifting when performing isolation. This may lead to poor isolation performance, and cause interference by the transmission signals at the receiver. Moreover, the HPUE operation may cause unwanted emissions outside of an allocated uplink channel, which may result in interference to or impair sensitivity (e.g., reference sensitivity (REFSENS)) of the receiver.

Additionally, regulatory entities (e.g., the Federal Communications Commission (FCC), the European Committee for Electrotechnical Standardization (CENELEC), and so on) may restrict a default or "normal" power operation of the user equipment to a specific absorption rate (SAR) limit. That is, SAR refers to an amount of radio frequency (RF) energy absorbed by a user (e.g., in the head of a user) when operating the user equipment. However, current SAR restrictions may not pertain to operation of the user equipment using an HPUE operation.

Embodiments herein provide various apparatuses and techniques to mitigate the effects of duplexer thermal degradation and reference sensitivity (REF SENS) impairment. In particular, the embodiments disclosed herein perform HPUE half-duplex operations in a paired spectrum (e.g., frequency division duplex (FDD) bands). That is, while a transmitter of user equipment transmits data using an HPUE operation over a first frequency range, a receiver of the user equipment may not receive data. When the transmitter is not transmitting data using the HPUE operation, the transmitter may transmit data over the first frequency range (e.g., using a default or "normal" power less than that of the HPUE) and the receiver may receive data over a second frequency range.

The user equipment may use static or dynamic schemes for enabling the HPUE operation (e.g., in response to determining that strength of the uplink transmission signals are less than a threshold strength). For example, the user equipment may notify a network of its capability for HPUE operation. In a static configuration, the network may instruct the user equipment to configure its transmitter to perform HPUE operations (e.g., in a half-duplex frequency division duplex (HD-FDD) mode) for a duration of a Radio Resource Control (RRC) session. In particular, the network may send an RRC reconfiguration message to the user equipment to configure its transmitter for HPUE operation for a duration of the RRC session. In a dynamic configuration, the network may instruct the user equipment to configure its transmitter to perform HPUE operations and/or default power operations for one or more desired time periods within a duration of an RRC session. In particular, the network may send a medium access control (MAC) control element (MAC-CE) to perform an HPUE operation or to return to a default power operation within the duration of the RRC session. In this manner, the network may prevent or mitigate duplexer thermal degradation and/or sensitivity impairment of the user equipment, thus ensuring better communication performance.

Additionally or alternatively, the user equipment may determine a duration or uplink duty cycle for performing HPUE operations that complies with SAR regulations, and send the uplink duty cycle to a network. The network may then generate a schedule with times to perform the HPUE operations based on the uplink duty cycle, and send instructions to the user equipment to perform the HPUE operations based on the schedule, thus complying with the SAR regulations.

To mitigate long-term thermal stress of a duplexer of the user equipment due to HPUE operation, the user equipment may implement transceiver architecture that enables HPUE transmission using a signal path that does not go through the duplexer. In some embodiments, the signal path that is separate and apart from the duplexer and may include a bandpass filter that passes only frequencies of the desired transmission frequency range. This HPUE signal path may avoid passing signals transmitted at high power through the duplexer, thus mitigating thermal stress of the duplexer during HPUE operation.

With the foregoing in mind, FIG. 1 is a block diagram of an electronic device 10, according to an embodiment of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions), or a combination of both hardware and software elements. The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in electronic device 10.

By way of example, the electronic device 10 may represent a block diagram of any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may perform the various functions described herein and below.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as a BLUETOOTH® network, for a local area network (LAN) or wireless local area network (WLAN), such as a network employing one of the IEEE 802.11x family of protocols (e.g., WI-FTC)), and/or for a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a satellite network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)). The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas. The power source 29 of the electronic device 10 may include any suitable source of power, such as a rechargeable lithium polymer (Li-poly) battery and/or an alternating current (AC) power converter. In certain embodiments, the electronic device 10 may take the form of a computer, a portable electronic device, a wearable electronic device, or other type of electronic device.

Figure 2:
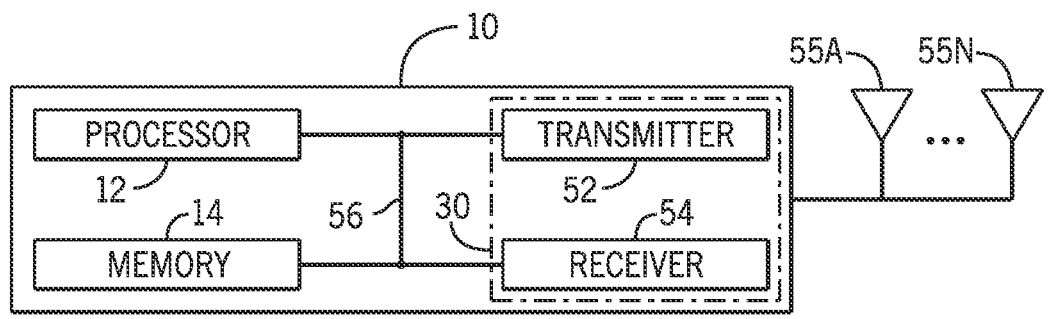
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, the transmitter 52, the receiver 54, and/or the antennas 55 (illustrated as 55A-55N) may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and a remote location via, for example, a network or direct connection associated with the electronic device 10 and an external transceiver (e.g., in the form of a cell, eNB (E-UTRAN Node B or Evolved Node B), base stations, and the like. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The electronic device 10 may include (not shown) multiple transmitters, multiple receivers, multiple transceivers, and/or multiple antennas as suitable for various communication standards.

The transmitter 52 may wirelessly transmit packets having different packet types or functions. For example, the transmitter 52 may transmit packets of different types generated by the processor 12. The receiver 54 may wirelessly receive packets having different packet types. In some examples, the receiver 54 may detect a type of a packet used and process the packet accordingly. In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

As mentioned above, the transceiver 30 of the electronic device 10 may include a transmitter and a receiver that are coupled to at least one antenna to enable the electronic device 10 to transmit and receive wireless signals. The electronic device 10 may include isolation circuitry that isolate the transmitter from received signals, and the receiver from transmission signals, thus reducing interference when communicating.

Figure 3:
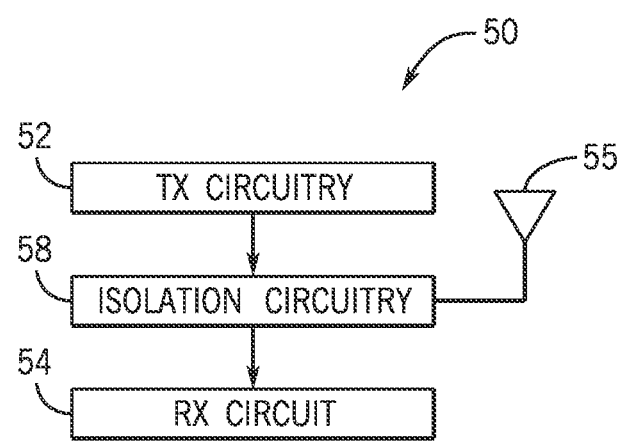
FIG. 3 is a block diagram of a transceiver of the electronic device of FIG. 1, according to an embodiment of the present disclosure.

FIG. 3 is a block diagram of the transceiver 30 (e.g., transceiver circuitry) of the electronic device 10, according to an embodiment of the present disclosure. As illustrated, the transceiver circuitry 30 includes isolation circuit 58 (e.g., including a duplexer) disposed between and coupled to a transmitter 52 (e.g., a transmit circuit) and a receiver 54 (e.g., a receive circuit). In some embodiments, the isolation circuit 58 is coupled to the one or more antennas 55. In alternative embodiments, the one or more antennas 55 may be disposed within the isolation circuit 58. The isolation circuit 58 enables signals (e.g., transmission signals) of a first frequency range from the transmitter 52 to pass through to the one or more antennas 55 and blocks the signals of the first frequency range from passing through to the receiver 54. The isolation circuit 58 also enables signals (e.g., received signals) of a second frequency range received via the one or more antennas 55 to pass through to the receiver 54 and blocks the received signals of the second frequency range from passing through to the transmitter 52. Each frequency range may be of any suitable bandwidth, such as between 0 and 100 gigahertz (GHz) (e.g., 10 megahertz (MHz)), and include any suitable frequencies. For example, the first frequency range (e.g., a transmit frequency range) may be between 880 and 890 MHz, and the second frequency range (e.g., a receive frequency range) may be between 925 and 935 MHz.

As noted above, when performing high power user equipment (HPUE) operations (such that the transmitter 52 uses a transmit power level greater than 23 decibel-milliwatts (dBm)) for transmission range, the electronic device 10 (e.g., user equipment) may realize increased temperature. This increased temperature may lead to component and/or performance degradation in the electronic device 10. For example, the isolation circuit 58 (e.g., including a duplexer) may degrade due to the higher temperature, resulting in frequency-shifting when performing isolation. This may lead to poor isolation performance, and cause interference by the transmission signals at the receiver 54. Moreover, the HPUE operation may cause unwanted emissions outside of an allocated uplink channel, which may result in interference to or impair sensitivity (e.g., reference sensitivity (REF SENS)) of the receiver 54. Reference sensitivity may refer to a minimum mean power received at an antenna connector for user equipment at which a throughput specification or requirement may be met for a reference measurement channel (e.g., the allocated uplink channel).

Figure 4:
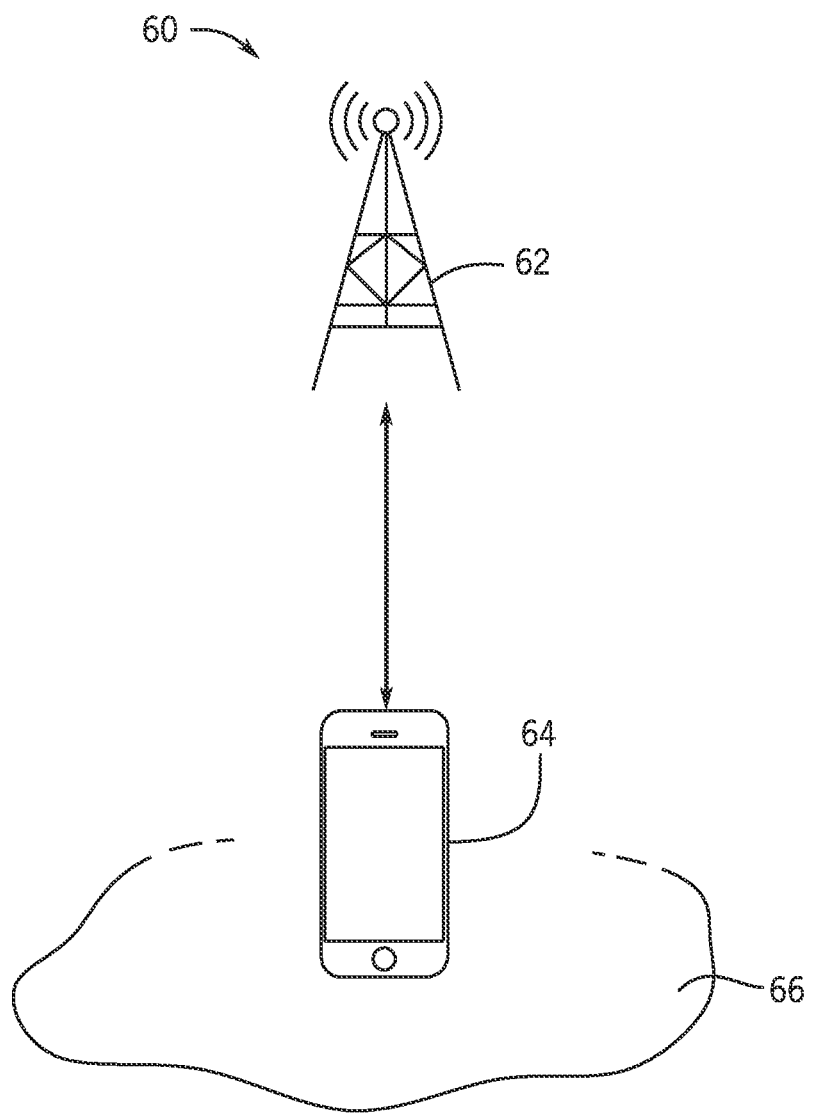
FIG. 4 is a schematic diagram of a wireless communication network supported by a base station and communicatively coupled to the electronic device (e.g., user equipment (UE)) of FIG. 1, according to an embodiment of the present disclosure.

With the foregoing in mind, FIG. 4 is an illustration of a wireless communication network 60 (e.g., a portion of a network is illustrated) that includes a base station 62 and user equipment (UE) 64 (e.g., such as the electronic device 10), according to embodiments of the present disclosure. The base station 62 may provide coverage of the network 60 (e.g., a cellular network) for devices in a geographical area or network 60, including the user equipment 64. The base station 62 and/or the user equipment 64 may have one or more components similar to the electronic device 10, and thus may include control circuitry such as the processors 12, the memory 14 and/or the nonvolatile storage 16, which may operate together to cause the base station 62 and/or the user equipment 64 to perform respective operations. In particular, the processor 12 of the base station 62 may perform operations of the network 60. It is noted that the user equipment 64 may include any of various types of computer systems or computing devices which may communicate with the base station 62. Examples of the user equipment 64 are any suitable portable electronic devices, mobile telephones, smartphones, portable gaming devices, laptops, wearable devices, or the like.

To establish connection to the network 60, the user equipment 64, via the transmitter 52 and/or the receiver 54, may establish a Radio Resource Control (RRC) session with the network 60. The network 60 and base station 62 may implement any suitable network technology or standard, such as Long-Term Evolution (LTE) or 4th Generation (4G) network through eNodeB (eNB) base stations, a New Radio (NR) or 5th Generation (5G) networks through next generation NodeB (gNB) base stations, and so on.

The network 60 may generate a schedule, including time periods to perform uplink (UL) and downlink (DL)) operations, based on information received from the user equipment 64 relating to user equipment capabilities (e.g., HPUE operations). The base station 62 may then instruct the user equipment 64 to configure its transmitter 52 and/or receiver 54 according to the schedule. It should be understood that uplink data or signals refer to transmissions from the transmitter 52 of the user equipment 64 to the base station 62 of the network 60, and downlink data or signals refer to the transmissions from the base station 62 of the network 60 to the receiver 54 of the user equipment 64. In some embodiments, the base station 62 may transmit commands to reconfigure communication hardware components (e.g., the transmitter 52 and/or the receiver 54) of the user equipment 64 based on multiple factors (e.g., signal strength, user equipment capabilities, and/or the ability of the user equipment 64 to perform HPUE operations). The commands may be in the form of, for example, RRC reconfiguration messages that may cause the user equipment 64 to configure its transmitter 52 for HPUE operation or a default power operation for a duration of the RRC session. In another example, the commands may be in the form of a medium access control (MAC) control element (MAC-CE) that may cause the user equipment 64 to configure its transmitter 52 for an HPUE operation or to return to a default power operation within the duration of the RRC session. As used herein, default power or a "normal" power may refer to a power level less than that of the high power level. In particular, the default and high power levels may be defined by a standards or regulatory body, such as the 3GPP (3rd Generation Partnership Project). For example, default power may refer to power class 3 as defined by the 3GPP, which includes a maximum transmit power level of less than or equal to 23 decibel-milliwatts (dBm). The HPUE power level may correspond to power class 2 as defined by the 3GPP, which includes a maximum transmit power level equal to 26 dBm.

Figure 5:
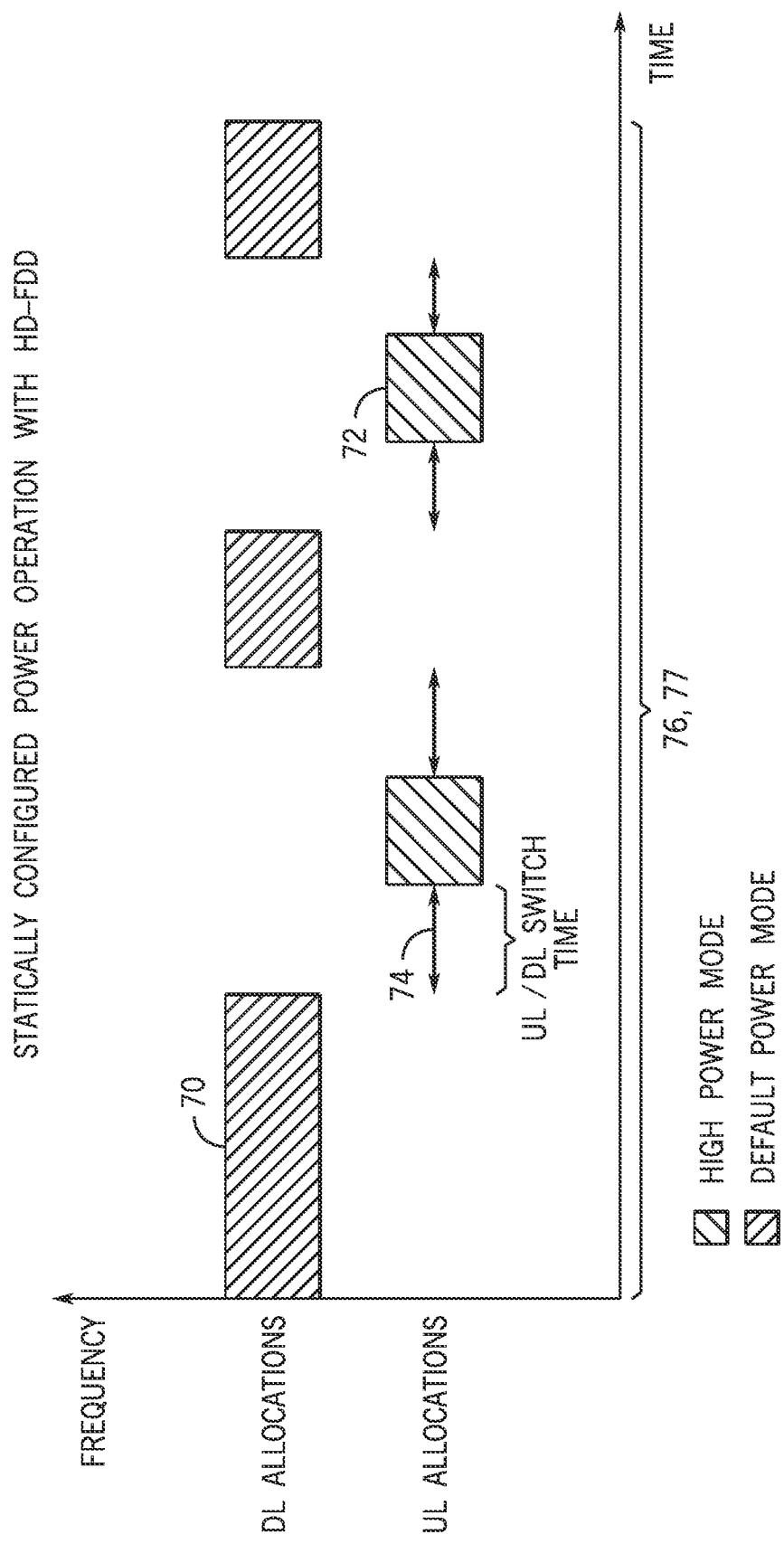
FIG. 5 is a timing diagram of high power user equipment (HPUE) operation using a static configuration, according to an embodiment of the present disclosure.

With the foregoing in mind, FIG. 5 is a timing diagram of high power operation in HD-FDD mode 76 implementing a static configuration, according to an embodiment of the present disclosure. The user equipment 64 may statically configure its communication hardware to transmit using high power operation in the HD-FDD mode 76 for an entire RRC session (e.g., 77).

The timing diagram depicts time on a horizontal axis and frequency on a vertical axis. In particular, the downlink (DL) allocations 70 indicate times when data or signals may be sent from the base station 62 and received by the user equipment 64 on a downlink frequency channel, and the uplink (UL) allocations 72 indicate times when data or signals may be sent by the user equipment 64 to the base station 62 on an uplink frequency channel. The downlink frequency channel, the uplink frequency channel, and the times that the downlink and uplink allocations 70, 72 are allocated may each be designated or defined by the base station 62. For example, the times that the downlink and uplink allocations 70, 72 are allocated may be according to the schedule generated by the network 60 as detailed above. As illustrated, the downlink and uplink allocations 70, 72 are frequency division duplexed (FDD), as the allocations 70, 72 each are assigned to respective frequency bands.

In particular, each of the uplink allocations 72 corresponds to HPUE operation. That is, the user equipment 64 may configure its transmitter 52 to perform HPUE operations during the uplink allocations 72, based on, for example, receiving an RRC reconfiguration message from the base station 62. In particular, an RRC stack is initialized at the start of the RRC session 77 for HPUE operation, and the receiver 54 of the user equipment 64 may receive a request to configure the transmitter 52 for HPUE operation from the base station 62/network 60. Upon receiving the request, the processor 12 of the user equipment 64 may configure the transmitter 52 for HPUE operation. Accordingly, during the RRC session 77, the transmitter 52 may be statically configured to perform HPUE operations, and may not perform default power operations. As illustrated, the transmitter 52 may perform the HPUE operations during uplink allocations 72 in half duplex (HD) FDD mode 76, such that, during the times the transmitter 52 performs the HPUE operations, the receiver 54 does not receive data (e.g., downlink allocations 70 are not scheduled at the same time as uplink allocations 72, and uplink allocations 72 are not scheduled at the same time as downlink allocations 70). The receiver 54 may perform downlink operations at default power during the downlink allocations 70. As noted above, the network 60 may schedule the downlink and uplink allocations 70, 72. Because there is a latency when switching between uplinking (by the transmitter 52) and downlinking (by the receiver 54) when operating in the HD-FDD mode 76, the network 60 may also schedule these switching times 74. In some embodiments, the network 60 may allocate approximately 100 milliseconds (ms) for the switching times 74, though any suitable time is contemplated (e.g., between 1 picosecond and 60 seconds, between 1 nanosecond and 10 seconds, between 1 ms and 1 second, and so on).

For example, the user equipment 64 may transmit a notification to the base station 62 of the network 60 that the user equipment 64 includes high power operation capabilities. Upon receiving the notification, the network 60, via the base station 62, may transmit a command to the user equipment 64 to transmit using a high power mode (e.g., 3GPP power class 2) or transmit using a default power mode (e.g., 3GPP power class 3) depending on the strength of an uplink transmission signal sent from the user equipment 64 to the base station 62. That is, if the uplink transmission signal sent from the user equipment 64 is weak (e.g., less than a threshold signal strength level), then the network 60 may determine that the user equipment 64 should increase a power level of its transmitter 52. The signal strength may include any suitable parameter indicative of a signal strength or quality of the user equipment 64, such as a reference signal received power (RSRP), a reference signal received quality (RSRQ), a received signal strength indicator (RSSI), a signal to interference noise ratio (SINR), a channel quality index (CQI), a physical cell identity (PCI), a block error ratio (BLER), downlink throughput, uplink throughput, and so on. Additionally, the threshold signal strength level may include any suitable signal strength level that may indicate that the uplink transmission signal sent from the user equipment 64 is weak or should be increased.

In some embodiments, the threshold signal strength level may be relative to the user equipment 64 (e.g., whether the user equipment 64 may increase transmission power any further). For example, the 3GPP technical specification (TS) 38.331 defines a cell-specific (e.g., common for all user equipment, including the user equipment 64, camped on a cell, such as the cell 66) target value of power spectral density of a physical uplink control channel (PUCCH) and a physical uplink shared channel (PUSCH) received by a base station, such as the base station 62, as a power control parameter (P0-nominal). During power control procedures, a power headroom (PHR) of the user equipment 64 is determined as a difference between the user equipment's maximum configured power ($P_{cmax}$) and the power control parameter (P0-nominal). Accordingly, if the user equipment 64 cannot increase its transmission or uplink power any more, then the power headroom is less than or equal to 0. If the user equipment 64 can increase its transmission or uplink power, then the power headroom is greater than 0. The power headroom may then be compared to the positive threshold signal strength level (P1) and a negative threshold signal strength level (-P1). In particular, the base station 62 may instruct the user equipment 64 to configure its transmitter 52 to operate in the HPUE mode when the power headroom is less than a negative threshold signal strength level (-P1), as reflected in Equation 1 below:

$$PHR < -P1 \qquad \text{(Equation 1)}$$

Additionally, the base station 62 may instruct the user equipment 64 to configure its transmitter 52 to operate in the default power mode when the power headroom is greater than a positive threshold signal strength level (P1), as reflected in Equation 2 below:

$$PHR > P1 \qquad \text{(Equation 2)}$$

The positive threshold signal strength level (P1) and the negative threshold signal strength level (-P1) may be any suitable value that indicates that the user equipment 64 should configure its transmitter 52 to operate in the HPUE mode or the default power mode, including between 0 and 100, such as 3, 6, and so on. In some embodiments, P1 may equal zero, such that the Equations 1 and 2 above may apply. In such embodiments, when the PHR equals zero, then the user equipment 64 may maintain the current power mode operation.

The positive threshold signal strength level (P1) and the negative threshold signal strength level (-P1) may both correspond to nonzero values, such that there is a range of values in between the positive threshold signal strength value and the negative signal strength value that do not correspond to instructing the user equipment 64 to configure its transmitter to operate in high power mode or default power mode. That is, for these range of values, the base station 62 may not send an instruction to the user equipment 64 to enter the high power mode or the default power mode, such that the user equipment 64 may maintain its current power mode (e.g., either the high power mode or default power mode).

For example, the value corresponding to the positive threshold signal strength level (P1) may be 3 and the value corresponding to the negative signal strength level (-P1) may be -3. The range of values greater than -3 and less than 3 thus do not correspond to the base station 62 sending an instruction to the transmitter 52 to operate in HPUE mode or default power mode. For example, a power headroom value of 2 is not less than the negative signal strength level (-P1) or greater than the positive signal strength level (P1). Accordingly, in this example the transmitter 52 may maintain its current power operation mode. Therefore, if the transmitter 52 was currently operating in HPUE mode, then the transmitter 52 would maintain the HPUE mode for the duration that the PHR value is greater than -3 and less than 3, as reflected in Equation 3 below:

$$P1 < PHR < P1 \qquad \text{(Equation 3)}$$

The network 60 may schedule downlink and uplink allocations 70, 72 for the user equipment 64 based on whether the user equipment 64 should operate in the high power mode or default power mode as determined by the network 60. In particular, the base station 62 may send a command, in response to determining weak or low uplink transmission signal strength of the user equipment 64, for the user equipment 64 to statically configure its transmitter 52 to perform high power operations in HD-FDD mode 76 for the entire RRC session 77. In particular, the network 60 may schedule uplink allocations 72 for the user equipment 64 to transmit signals in high power mode at different times than downlink allocations 70 for the user equipment 64 to receive signals. As such, high power uplink transmissions may be restricted to time slots where downlink resources are not scheduled. The network 60 may also schedule switching time 74 between the downlink allocations 70 and the uplink allocations 72 to account for reconfiguration time for user equipment communication hardware (e.g., the transmitter 52 and the receiver 54) to switch between downlink and uplink operations. For example, the user equipment 64 may reconfigure (enable/activate the receiver 54 and disable/deactivate the transmitter 52) to receive a downlink transmission, rather than send an uplink transmission (e.g., performing HPUE operations). In some embodiments, the base station 62 may also schedule or account for time at the start of the RRC session 77 for the user equipment 64 to reconfigure the transmitter 52 for the HPUE operation. The one or more switching times 74 scheduled for the various communication hardware reconfigurations may be for similar time amounts or varying time amounts depending on the hardware configurations corresponding to the user equipment 64. The base station 62 may then allocate the downlink allocations 70 and the uplink allocations 72 according to the schedule, along with the scheduled one or more switching times 74 to allow for hardware reconfiguration to enable HPUE operation and/or switching between uplink and downlink operations. The mode switching boundary may be set at a power class 3 maximum output power and/or determined by the network for the user equipment 64 throughput and performance optimization. Below the mode switching boundary, the user equipment 64 would be running at FDD band full-duplexer operation, and above the mode switching boundary, half-duplex operation is scheduled.

In this manner, scheduling high power uplinking and downlinking at different times and at frequencies, as shown in the timing diagram of FIG. 5, may mitigate or reduce interference of high power transmission signals into an allocated reception channel (e.g., either due to the high power itself or due to frequency shifts in a duplexer of isolation circuitry 58), thus improving communication quality.

Figure 6:
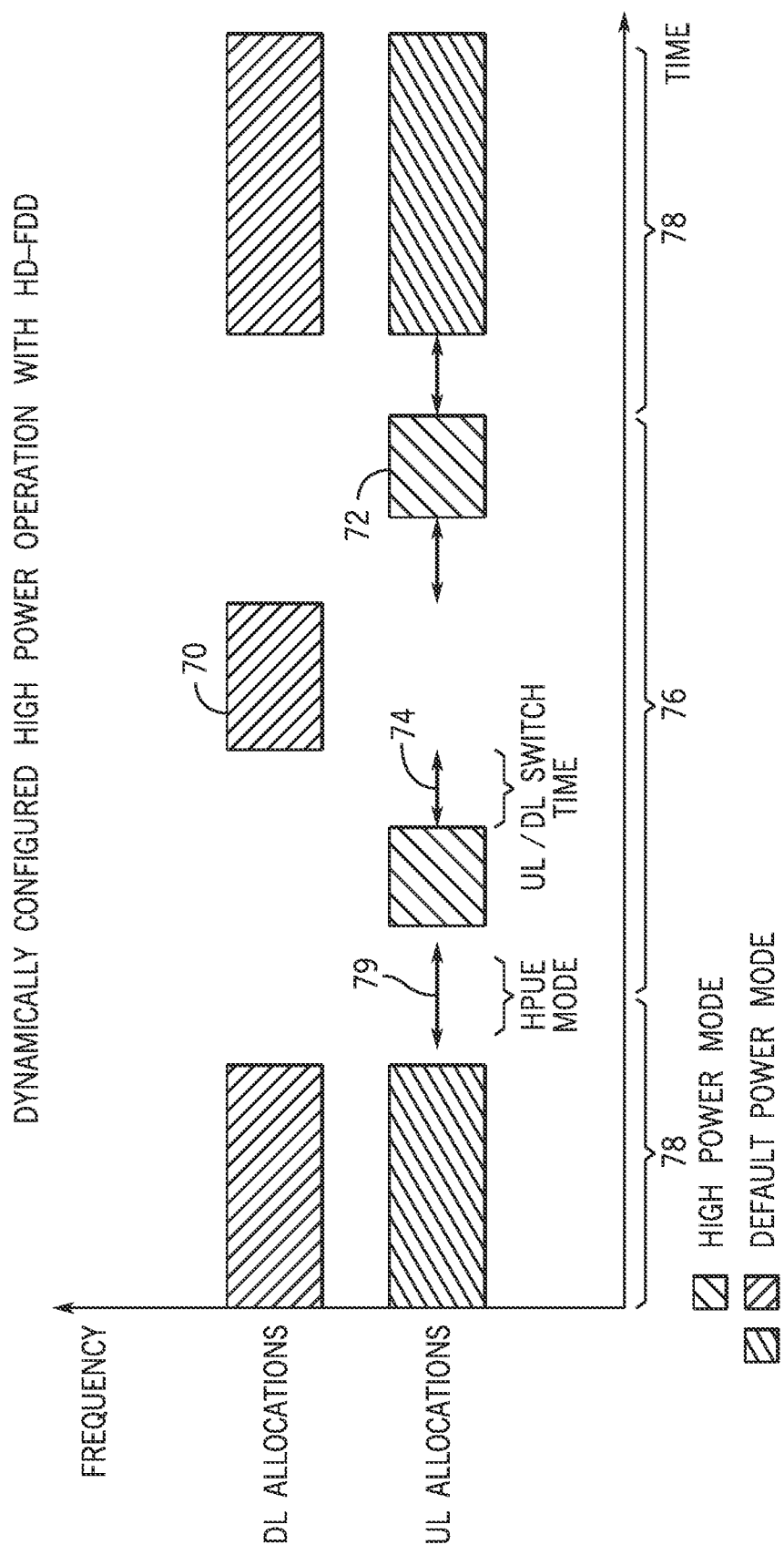
FIG. 6 is a timing diagram of HPUE operation using a dynamic configuration, according to an embodiment of the present disclosure.

In additional or alternative embodiments, the network 60 may dynamically reconfigure the user equipment 64 to transition between the HD-FDD mode 76 (which enables HPUE operation) to a full-duplex FDD (FD-FDD) 78 mode within the RRC session 77, as shown in FIG. 6, which is a timing diagram of HPUE operation in HD-FDD mode 76 using a dynamic configuration, according to an embodiment of the present disclosure. In particular, the user equipment 64 may reconfigure between high power operations and default power operations dynamically within an RRC session 77 by utilizing a MAC control element (MAC-CE).

The timing diagram depicts time on a horizontal axis and frequency on a vertical axis, as well as uplink allocations 72 and downlink allocations 70 for the user equipment 64, according to the schedule generated by the network 60, as detailed above. In particular, the timing diagram depicts dynamically configured HPUE operation of the transmitter 52 in the HD-FDD mode 76, and default power operation of the transmitter 52 and the receiver 54 in the FD-FDD mode 78. The network 60 may cause the base station 62 to send one or more RRC messages to the user equipment, which may cause the user equipment 64 to enter the HD-FDD mode 76 and/or enter the FD-FDD mode 78. Moreover, the network 60 may cause the base station 62 to send one or more MAC-CEs to the user equipment, which may cause the user equipment 64 to perform one or more high power operations and/or one or more default power operations while in the HD-FDD mode 76 during the RRC session 77. That is, the base station 62 may send multiple MAC-CEs to cause the user equipment 64 to perform multiple high power operations and multiple default power operations without to establish a new RRC session 77.

For example, the user equipment 64 may initially send a notification to the base station 62 to notify the network 60 that the user equipment 64 includes high power operation capabilities, as discussed above in FIG. 5. The network 60 may schedule uplink allocations 72 and downlink allocations 70, including for default power operations and high power operations, for the RRC session 77. The network 60 may also schedule one or more switching times 74 for reconfiguration of the user equipment 64 to perform HPUE operations and/or to switch between uplink and downlink operations. The network 60 may schedule HPUE operations based on determining that a signal strength of the user equipment 64 is weak (e.g., below a threshold value) over time (e.g., over at least the RRC session 77). For example, the base station 62 may monitor the signal strength of the user equipment 64 throughout the RRC session 77, and dynamically update the power mode based on the monitored signal strength.

That is, at an initial time, the base station 62 may determine that signal strength of a user equipment signal is above a threshold value indicating sufficient signal strength (e.g., determine that a power headroom of the transmitter 52 is greater than a positive threshold value as shown in Equation 2 above). Accordingly, the base station 62 may transmit an instruction (e.g., an RRC message) to the user equipment 64 to perform default power operations in FD-FDD mode 78. In other words, the network 60 may configure the user equipment 64 to transmit and/or receive signals using a default power mode 78 by allocating downlink and uplink allocations 70, 72 during the same time periods. At a subsequent time, the base station 62 may determine that the user equipment 64 signal quality has decreased below the threshold signal strength value (e.g., determine that a power headroom of the transmitter 52 is less than a negative threshold value as shown in Equation 1 above). In response, the base station 62 may transmit an instruction (e.g., an RRC message) to the user equipment 64 to perform in HD-FDD mode 76. The RRC message (or a MAC-CE) may include a defined switching time 79 to reconfigure the user equipment hardware (e.g., the transmitter 52 and/or the receiver 54) from default power operation to HPUE operation. In some embodiments, the network 60 may allocate approximately 100 ms for the switching time 79, though any suitable time is contemplated (e.g., between 1 picosecond and 60 seconds, between 1 nanosecond and 10 seconds, between 1 ms and 1 second, and so on). The user equipment 64 may then receive the RRC message (or the MAC-CE), reconfigure the transmitter 52 and/or the receiver 54 for HPUE operations, and perform uplink transmissions using the high power mode during the uplink allocation 72. The network 60 may also schedule downlink allocations 70 at times when there are no uplink allocations 72 (e.g. performed at high power), schedule uplink allocations 72 at times when there are no downlink allocations 70, and one or more switching times 74 between downlink and uplink allocations 70, 72 to allow the user equipment 64 to reconfigure communication hardware (e.g., the transmitter 52 and/or the receiver 54) from uplink to downlink operation, during the same RRC session 77. Specifically, in response to receiving a subsequent MAC-CE, the user equipment 64 may reconfigure the user equipment hardware (e.g., the transmitter 52 and/or the receiver 54) to default power operation (e.g., within the scheduled one or more switching times 74 for the user equipment 64 to reconfigure from uplink to downlink operation), and receive signals using the receiver 54 during downlink allocations 70, corresponding to the times when the user equipment 64 is not transmitting using high power operations.

The network 60 may subsequently determine that the signal quality of the user equipment 64 signal has improved above the threshold value during the same RRC session 77. In response, the base station 62 may instruct the user equipment 64 to reconfigure to the FD-FDD mode 78 along with a scheduled switching time 79 for the user equipment 64 to reconfigure from HPUE mode to default power mode. The user equipment 64 may receive the base station 62 command and implement the hardware reconfiguration of the user equipment 64 to default power mode. The user equipment 64 may then send uplink signals during the uplink allocations 72 and receive downlink signals during the downlink allocations 70 over the same time periods in FD-FDD mode 78. In additional or alternative embodiments, the base station 62 may use physical layer signaling (e.g., via a downlink control indication (DCI)) instead of or in addition to RRC messages and/or MAC-CEs to cause the user equipment to perform the HPUE operations.

Figure 7:
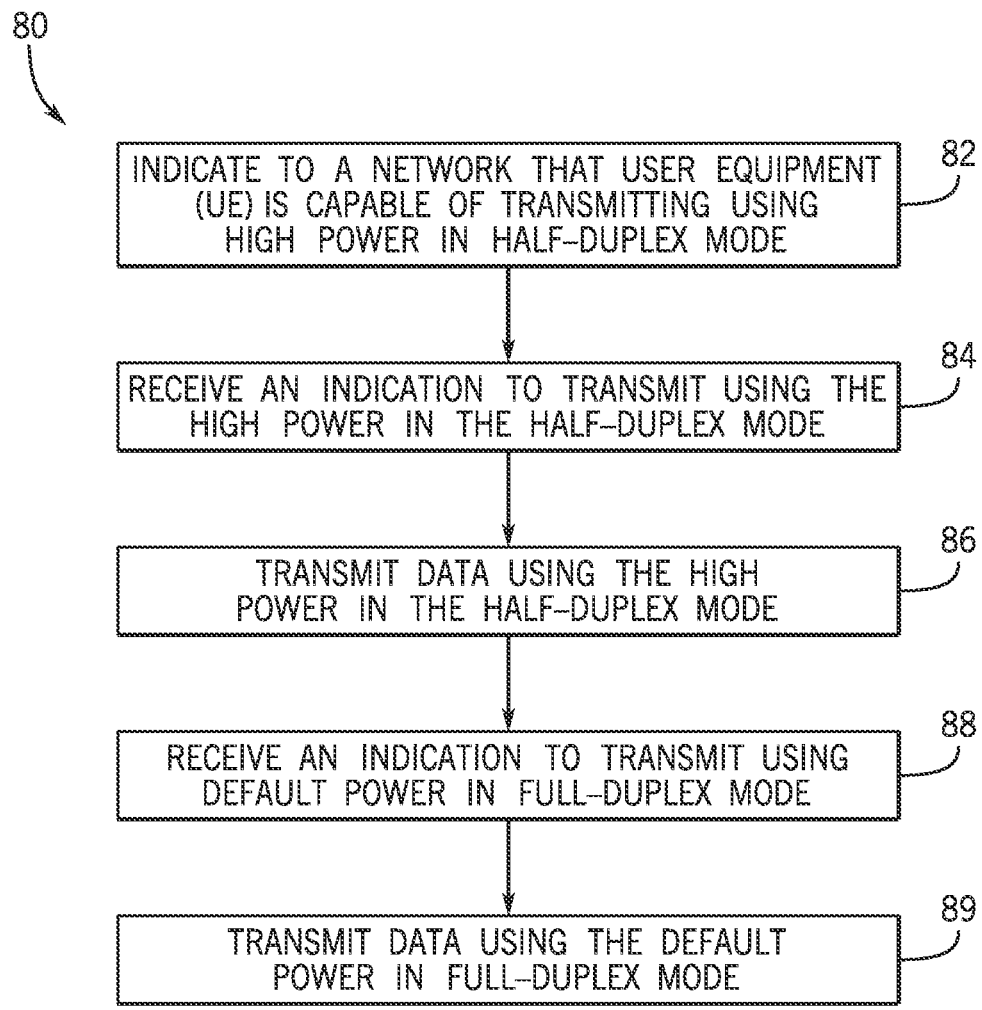
FIG. 7 is a flow diagram for the electronic device (e.g., user equipment (UE)) of FIG. 1 to perform the HPUE operation of FIGS. 5 and 6, according to an embodiment of the present disclosure.

With the foregoing in mind, FIG. 7 is a flowchart of a method 80 for the user equipment 64 to perform the HPUE operations of FIGS. 5 and/or 6, according to an embodiment of the present disclosure. Any suitable device (e.g., a controller) that may control components of the user equipment 64, such as the processor 12, may perform the method 80. In some embodiments, the method 80 may be implemented by executing instructions stored in a tangible, non-transitory, computer-readable medium, such as the memory 14 or storage 16, using the processor 12. For example, the method 80 may be performed at least in part by one or more software components, such as an operating system of the user equipment 64, one or more software applications of the user equipment 64, and the like. While the method 80 is described using steps in a specific sequence, it should be understood that the present disclosure contemplates that the described steps may be performed in different sequences than the sequence illustrated, and certain described steps may be skipped or not performed altogether.

In process block 82, the processor 12 of the user equipment 64 may transmit an indication that the user equipment 64 is capable of HPUE operations (e.g., transmitting using 3GPP power class 2) in HD-FDD mode to the base station 62 of the network 60. In some embodiments, the indication may be sent each time the user equipment 64 connects to the network 60.

In process block 84, the processor 12 receives an indication from the network 60 to perform uplink transmissions utilizing the HPUE operations in HD-FDD mode 76. In some embodiments, the indication may also include one or more scheduled times when the user equipment 64 may perform uplink transmissions (e.g., the uplink allocations 72 shown in FIGS. 5 and 6). The indication may also include a scheduled switching time 74 where no uplink or downlink allocations 72, 70 are scheduled. The switching time 74 may be utilized by the user equipment 64 to reconfigure the hardware circuitry to HPUE operation capabilities and/or transition the hardware circuitry between uplink and downlink operations. The configuration may be specified for an entire RRC session 77, as discussed in FIG. 5 above, or the configuration may be updated by the user equipment 64 throughout the RRC session 77 by utilizing a MAC-CE, as discussed above in FIG. 6.

In process block 86, the processor 12 may configure the user equipment 64 (e.g., the transmitter 52) to transmit data using the HPUE operations in the HD-FDD mode 76. In particular, the user equipment 64 may perform the uplink transmissions during the uplink allocations 72 in HD-FDD mode. At a later time, in process block 88, the processor 12 may receive an indication from the network to send uplink signals and receive downlink signals utilizing a default power mode (e.g., 3GPP power class 3) in the FD-FDD mode 78. In particular, the indication may include an uplink allocation 72 that is scheduled during a downlink allocation 70. In some embodiments, the indication may include the switching time 74 for the user equipment 64 to reconfigure the hardware to FD-FDD mode 78.

In process block 89, the processor 12 may enable the user equipment 64 to simultaneously transmit or uplink data (e.g., during an uplink allocation 72) and receive or downlink data (e.g., during a downlink allocation 70) utilizing default power operations in the FD-FDD mode 78. In this manner, the method 80 enables the user equipment 64 to reconfigure between performing HPUE operations in the HD-FDD mode 76 and performing default power operations in the FD-FDD mode 78. Because reception does not occur while the transmitter 52 may perform the HPUE operations, unwanted emissions outside of the uplink channel caused by uplink transmissions in high power mode may be avoided or mitigated, thus improving communication quality.

Figure 8:
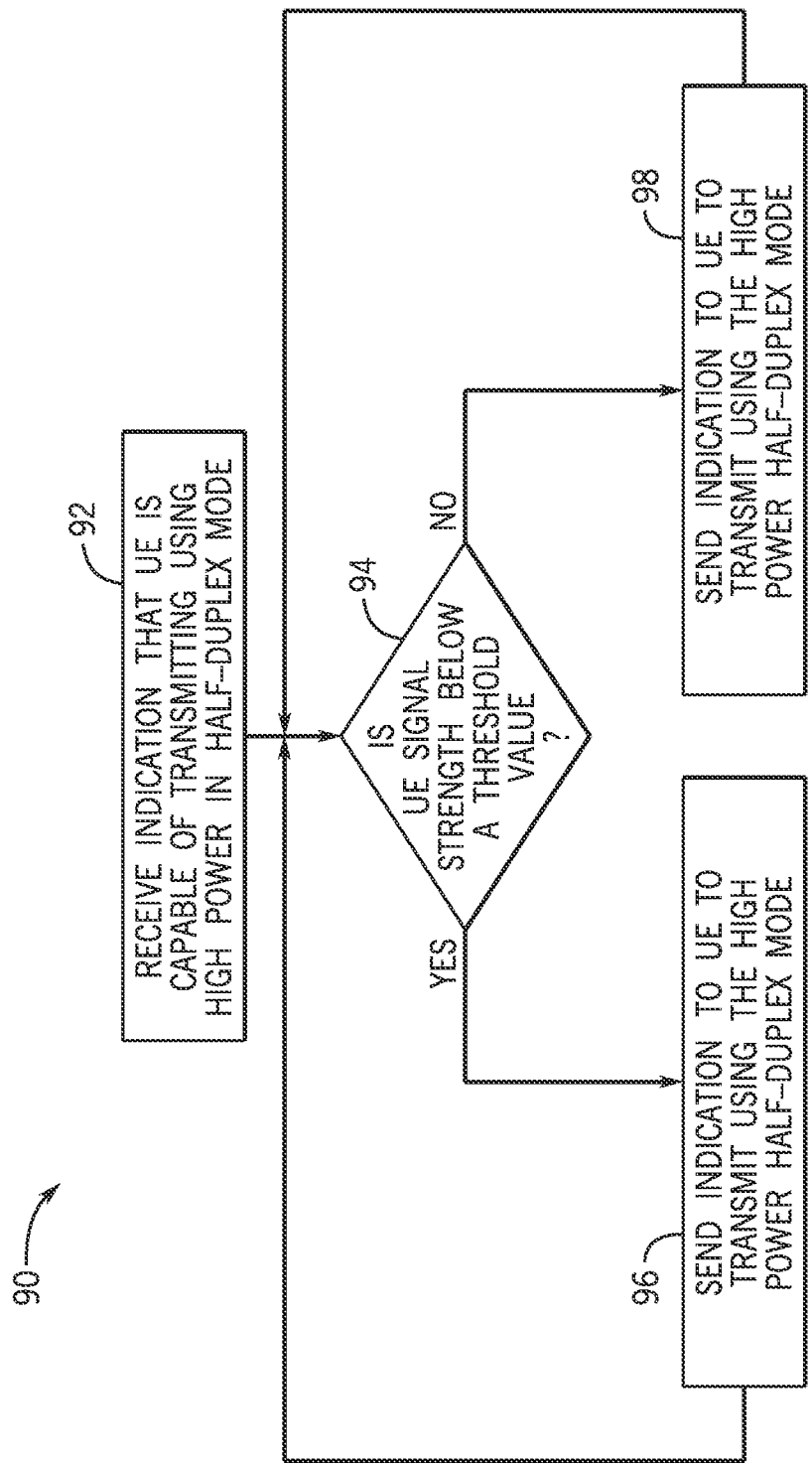
FIG. 8 is a flow diagram for the base station of FIG. 4 to perform the HPUE operations of FIGS. 5 and 6, according to an embodiment of the present disclosure.

With the foregoing in mind, FIG. 8 is a flowchart of a method 90 for the base station 62 of the network 60 to perform the HPUE operations of FIGS. 5 and/or 6, according to an embodiment of the present disclosure. Any suitable device (e.g., a controller) that may control components of the base station 62 and/or the network 60, such as the processor 12, may perform the method 90. In some embodiments, the method 90 may be implemented by executing instructions stored in a tangible, non-transitory, computer-readable medium, such as the memory 14 or storage 16, using the processor 12. For example, the method 90 may be performed at least in part by one or more software components, such as an operating system of the base station 62, one or more software applications of the base station 62, and the like. While the method 90 is described using steps in a specific sequence, it should be understood that the present disclosure contemplates that the described steps may be performed in different sequences than the sequence illustrated, and certain described steps may be skipped or not performed altogether.

In process block 92, the processor 12 of the base station 62 may receive an indication from the user equipment 64 that the user equipment 64 is capable of transmitting using HPUE operations in the HD-FDD mode 76. The network 60 may schedule uplink and downlink allocations 72, 70 and the power mode for the user equipment 64 uplink transmissions (e.g., HD-FDD mode 76, FD-FDD mode 78) based on the user equipment 64 capability.

In process block 94, the processor 12 determines, based upon the user equipment 64 uplink transmission signal, if the uplink transmission signal is above a threshold value corresponding to signal strength. For example, the processor 12 may determine whether a power headroom of the transmitter 52 is greater than a positive threshold value, as shown in Equation 2 above. If the base station 62 determines that the uplink transmission strength is below the threshold value (e.g., the power headroom of the transmitter 52 is less than a negative threshold value, as shown in Equation 1 above), at process block 96, the base station 62 sends an indication to the user equipment 64 to configure its communication hardware (e.g., the transmitter 52) to transmit using HPUE operations in the HD-FDD mode 76. If the processor 12, at process block 98, determines that the uplink transmission received from the user equipment 64 is above a threshold signal strength value (e.g., the power headroom of the transmitter 52 is greater than a positive threshold value, as shown in Equation 2 above), then the base station 62 may send an indication to the user equipment 64 to configure its communication hardware (e.g., the transmitter 52) to transmit using the default power mode in the FD-FDD mode 78. In some embodiments, the configuration may be specified for an entire RRC session 77, as discussed in FIG. 5 above. In additional or alternative embodiments, the processor 12 may monitor the signal strength of the user equipment 64 transmissions so that the base station 62 may dynamically schedule the power mode (e.g., using MAC-CEs) based on the signal strength throughout the RRC session 77.

In this manner, the method 90 enables the base station 62 and the network 60 to reconfigure the user equipment 64 between performing HPUE operations in the HD-FDD mode 76 and performing default power operations in the FD-FDD mode 78. Because reception does not occur while the transmitter 52 may perform the HPUE operations, unwanted emissions outside of the uplink channel caused by uplink transmissions in high power mode may be avoided or mitigated, thus improving communication quality.

As noted above, regulatory entities (e.g., the Federal Communications Commission (FCC), the European Committee for Electrotechnical Standardization (CENELEC), and so on) may restrict the default power operation of user equipment 64 to a specific absorption rate (SAR) limit or an amount of radio frequency (RF) energy absorbed by a user (e.g., in the head of a user) when operating the user equipment 64. However, current SAR restrictions may not pertain to operation of the user equipment 64 when using HPUE operations.

Figure 9:
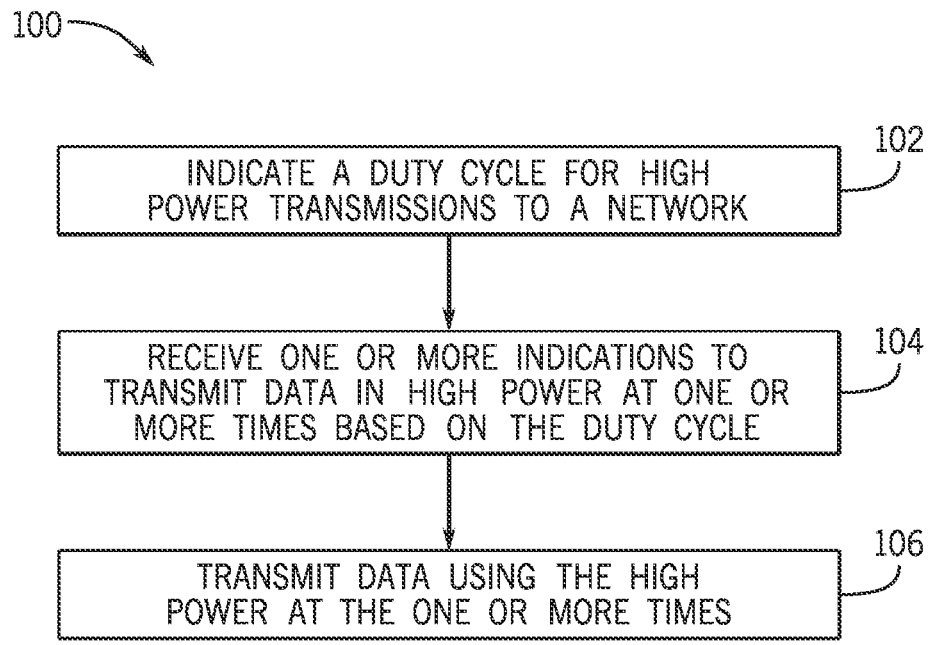
FIG. 9 is a flow diagram for the electronic device (e.g., user equipment (UE)) of FIG. 1 to perform HPUE operations based on uplink duty cycle, according to an embodiment of the present disclosure.

With this in mind, FIG. 9 is a flow diagram of method 100 for the user equipment 64 to perform HPUE operations based on an uplink duty cycle, according to an embodiment of the present disclosure. Any suitable device (e.g., a controller) that may control components of the user equipment 64, such as the processor 12, may perform the method 100. In some embodiments, the method 100 may be implemented by executing instructions stored in a tangible, non-transitory, computer-readable medium, such as the memory 14 or storage 16, using the processor 12. For example, the method 90 may be performed at least in part by one or more software components, such as an operating system of the user equipment 64, one or more software applications of the user equipment 64, and the like. While the method 100 is described using steps in a specific sequence, it should be understood that the present disclosure contemplates that the described steps may be performed in different sequences than the sequence illustrated, and certain described steps may be skipped or not performed altogether.

In process block 102, the processor 12 indicates a duty cycle for high power transmissions to a network 60. In particular, the processor 12 may determine an uplink duty cycle (e.g., frequency of uplink allocations relative to downlink allocations) for HPUE operation in HD-FDD mode 76 based on the SAR regulatory requirements discussed above. The user equipment 64 may then transmit an indication to a base station 62 of the network 60 that the user equipment 64 is capable of HPUE operations (e.g., transmitting using 3GPP power class 2) in HD-FDD mode 76 and the corresponding uplink duty cycle for performing HPUE operations in HD-FDD mode 76 based on the SAR regulation requirements.

In process block 104, the processor 12 receives an indication from the base station 62 to reconfigure the transmitter 52 of the user equipment 64 to transmit data (e.g., perform uplink transmissions) utilizing the HPUE operations in HD-FDD mode 76 based on the uplink duty cycle. In some embodiments, the indication may include the switching time 74 where no uplink or downlink allocations 72, 70 are scheduled. The switching time 74 may be utilized by the user equipment 64 to reconfigure the hardware circuitry to HPUE operation capabilities and/or transition the hardware circuitry between uplink and downlink operations. The configuration may be specified for an entire RRC session 77 by utilizing an RRC message, as discussed in FIG. 5 above, or the configuration may be updated by the user equipment 64 throughout the RRC session 77 by utilizing a MAC-CE, as discussed above in FIG. 6. The processor 12, may receive one or more subsequent indications from the network 60 to perform uplink transmissions utilizing the HPUE operations in HD-FDD mode 76 (e.g., instructions for the user equipment 64 to reconfigure the transmitter 52 to operate in the HPUE operations) based on the uplink duty cycle for performing HPUE operations in HD-FDD mode 76 transmitted by the user equipment 64 to the network 60. In particular, the processor 12 may receive multiple indications from the base station 62 of the network 60 to perform uplink transmissions utilizing the HPUE operations in HD-FDD mode 76 at multiple times corresponding to multiple uplink allocations 72 scheduled by the network 60 based on the duty cycle. The processor 12, may also receive one or more subsequent indications from the network 60 to perform uplink transmissions at default power in FD-FDD mode 78 (e.g., instructions for the user equipment 64 to reconfigure the transmitter 52 to operate in the default power mode).

In response to receiving the indication to transmit data utilizing the HPUE operations in HD-FDD mode 76, the processor 12, in process block 106, transmits data using high power according to the uplink allocations 72 indicated by the network 60. In this manner, the method 100 enables the user equipment 64 to meet SAR regulatory requirements when performing HPUE operations by regulating the frequency of the uplink allocations relative to the downlink allocations.

Figure 10:
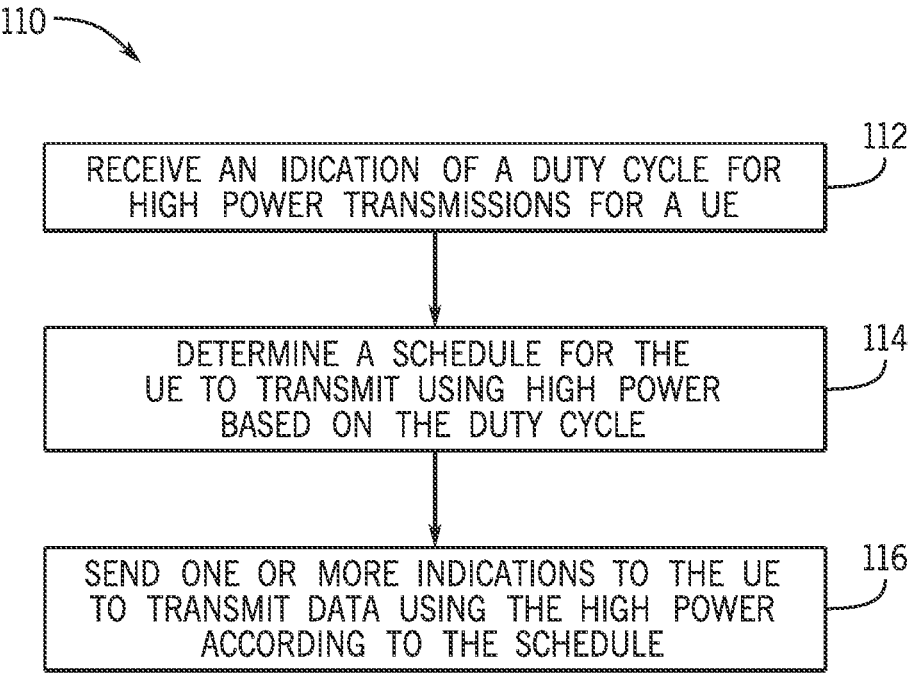
FIG. 10 is a flow diagram of network scheduling of the HPUE operation based on the uplink duty cycle of FIG. 9, according to an embodiment of the present disclosure.

Based on the foregoing, FIG. 10 illustrates a flow diagram of a method 110 for the base station 62 of the network 60 to manage user equipment HPUE operations based on an uplink duty cycle, according to an embodiment of the present disclosure. Any suitable device (e.g., a controller) that may control components of the base station 62, such as the processor 12, may perform the method 110. In some embodiments, the method 110 may be implemented by executing instructions stored in a tangible, non-transitory, computer-readable medium, such as the memory 14 or storage 16, using the processor 12. For example, the method 110 may be performed at least in part by one or more software components, such as an operating system of the base station 62 one or more software applications of the base station 62, and the like. While the method 110 is described using steps in a specific sequence, it should be understood that the present disclosure contemplates that the described steps may be performed in different sequences than the sequence illustrated, and certain described steps may be skipped or not performed altogether.

In process block 112, the processor 12 of the base station 62 receives an indication from the user equipment 64 that the user equipment 64 is capable of transmitting using HPUE operations in the HD-FDD mode 76 and a corresponding uplink duty cycle for the HPUE operations.

In process block 114, the network 60 generates a schedule for the user equipment 64 to transmit using high power based on the uplink duty cycle. In particular, the network 60 may schedule uplink and downlink allocations 72, 70, the power mode for the uplink and downlink allocations 72, 70 (e.g., HPUE or default power mode), and/or the duplexing mode (e.g., HD-FDD mode 76, FD-FDD mode 78) based on the user equipment 64 capability and the uplink duty cycle. That is, the network 60 may schedule the uplink and downlink allocations 72, 70 that correspond to HD-FDD mode 76 according to the frequency of uplink allocations to downlink allocations specified in the uplink duty cycle. In process block 116, the processor 12 sends one or more indications to the user equipment 64 to transmit data according to the uplink allocations 72 for high power transmissions. The indication to perform uplink transmission utilizing the HPUE operations may include instructions for the user equipment 64 to reconfigure the transmitter 52 to operate in the HPUE operations. The processor 12, may also receive one or more subsequent indications from the network 60 to perform uplink transmissions at default power in FD-FDD mode 78 (e.g., instructions for the user equipment 64 to reconfigure the transmitter 52 to operate in the default power mode) from the network 60. The processor 12 may determine, based upon the user equipment 64 uplink transmission signal, if the uplink transmission signal is above a threshold value corresponding to signal strength. For example, the processor 12 may determine whether a power headroom of the transmitter 52 is greater than a positive threshold value, as shown in Equation 2 above. If the network 60 determines that the uplink transmission strength is below the threshold value (e.g., the power headroom of the transmitter 52 is less than a negative threshold value, as shown in Equation 1 above), at process block 96, the base station 62 of the network 60 sends an indication to the user equipment 64 to configure its communication hardware (e.g., the transmitter 52) to transmit using HPUE operations in the HD-FDD mode 76. The base station 62 may transmit an indication to the user equipment 64 to reconfigure the transmitter 52 to transmit using HPUE operations in the HD-FDD mode 76 at a first time. The network 60 may determine at a subsequent time according to the scheduled uplink and downlink allocations that the time corresponds to downlink allocations 70 for HD-FDD mode 76. The base station 62 may then transmit an indication to the user equipment 64 to not transmit HPUE operations in the HD-FDD mode 76 at the second time. The network 60 may then determine at a subsequent time that uplink allocations 72 corresponding to the HD-FDD mode 76 are scheduled. The base station 62 may transmit an indication the network to transmit in HPUE in HD-FDD 76 at the subsequent time according to the uplink allocation schedule. The base station 62 may send one or more indications to the user equipment 64 during HPUE operation to specify uplink transmissions for the user equipment 64 based on the scheduled uplink and downlink allocations based on the uplink duty cycle.

In this manner, the method 110 enables the base station 62 to manage user equipment 64 uplink transmissions to meet SAR regulatory requirements regarding RF output when performing HPUE operations by averaging emissions over a time period that corresponds to the duty cycle.

Figure 11:
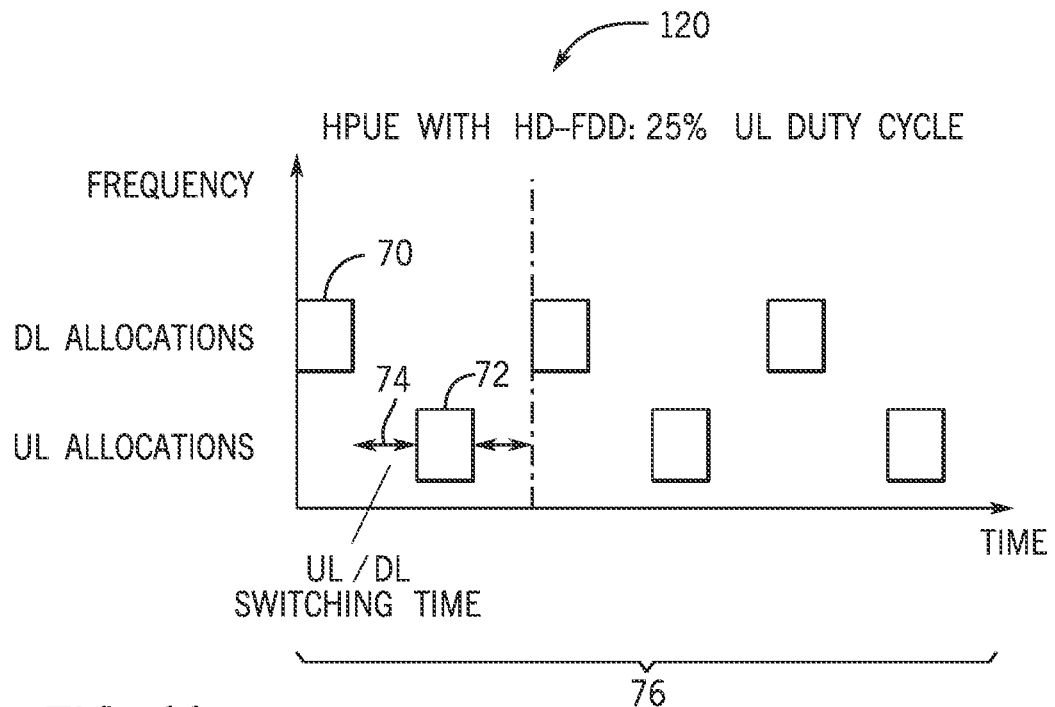
FIG. 11 is a timing diagram for performing HPUE operations using a first example uplink duty cycle, according to an embodiment of the present disclosure.

As an illustrative example, FIG. 11 is a timing diagram 120 for performing HPUE operations based on a first example uplink duty cycle of HPUE operation in HD-FDD mode 76, according to an embodiment of the present disclosure. In particular, the user equipment 64 may transmit an uplink duty cycle that specifies HPUE uplink allocation frequency relative to downlink allocation frequency for an RRC session (e.g., 77).

The timing diagram depicts time on a horizontal axis and frequency on a vertical axis. In particular, the downlink (DL) allocations 70 indicate times when data or signals may be sent from the base station 62 and received by the receiver 54 of the user equipment 64 on a downlink frequency channel, and the uplink (UL) allocations 72 indicate times when data or signals may be sent by the transmitter 52 of the user equipment 64 performing HPUE operations to the base station 62 on an uplink frequency channel. The downlink frequency channel, the uplink frequency channel, and the times that the downlink and uplink allocations 70, 72 are allocated may each be designated or defined by the network 60. For example, the downlink and uplink allocations 70, 72 may be scheduled by the network 60. As illustrated, the downlink and uplink allocations 70, 72 are frequency division duplexed (FDD), as the allocations 70, 72 each are assigned to different frequency bands.

For example, the schedule shown in the timing diagram of FIG. 11 may be generated when the user equipment 64 transmits an uplink duty cycle for the HPUE operations to the base station 62 of the network 60. The network 60 may then schedule uplink and downlink allocations 72, 70 according to the uplink duty cycle during HPUE operations. As illustrated, the user equipment 64 may transmit an indication of a 25% uplink duty cycle for HPUE operations to the network 60. The network 60 may then restrict the uplink allocations 72 in the schedule to be 25% of the total uplink and downlink allocations 72, 70 for the schedule. As such, the user equipment 64 may transmit using HPUE operations in HD-FDD mode 76 during the uplink allocations 72 corresponding to the uplink duty cycle determined by the network 60 and the signal strength of the uplink transmissions as discussed above in FIGS. 5 and 6.

Figure 12:
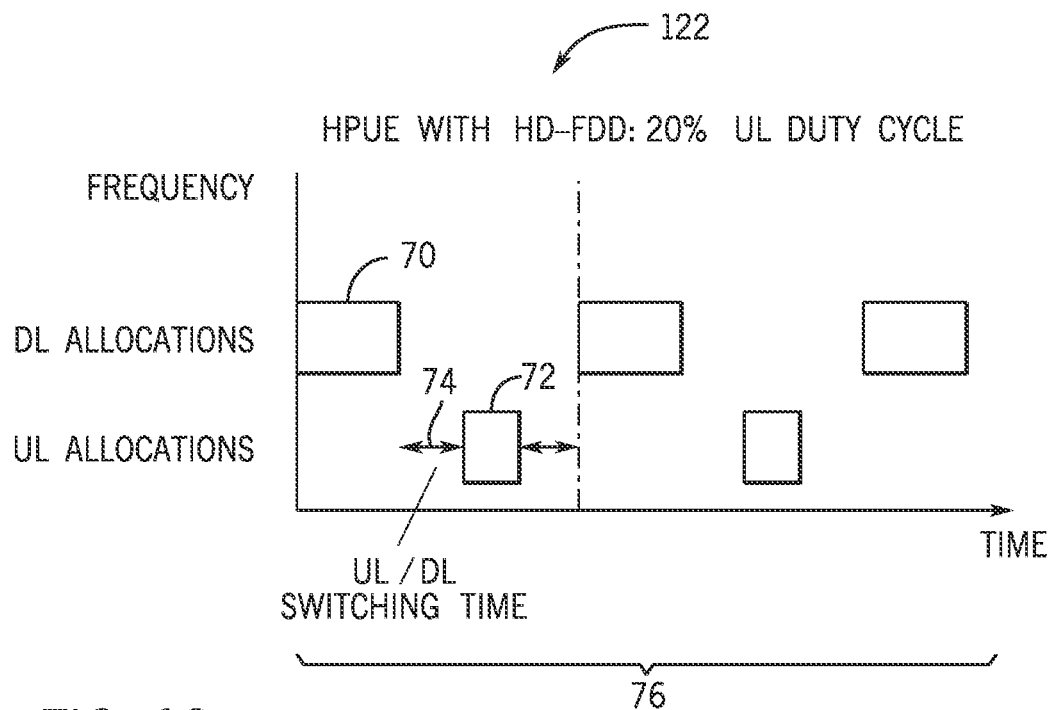
FIG. 12 is a timing diagram for performing HPUE operations using a second example uplink duty cycle, according to an embodiment of the present disclosure.

FIG. 12 is a timing diagram 122 for performing HPUE operations based on a second example uplink duty cycle of high power operation in HD-FDD mode 76, according to an embodiment of the present disclosure. The timing diagram is similar to the above FIG. 11, but depicts a different uplink duty cycle. As illustrated, the user equipment 64 may transmit an indication of HPUE operation capabilities and a corresponding uplink duty cycle of 20% for the HPUE operation to the base station 62 of the network 60. The network 60 may restrict the uplink allocations 72 for the schedule to 20% of the total uplink and downlink allocations 72, 70 for the schedule. As such, the user equipment 64 may transmit using HPUE operations in FD-FDD mode 78 during the uplink allocations 72 corresponding to the schedule determined by the network 60 and the signal strength of the uplink transmissions as discussed above in FIGS. 5 and 6.

Figure 13:
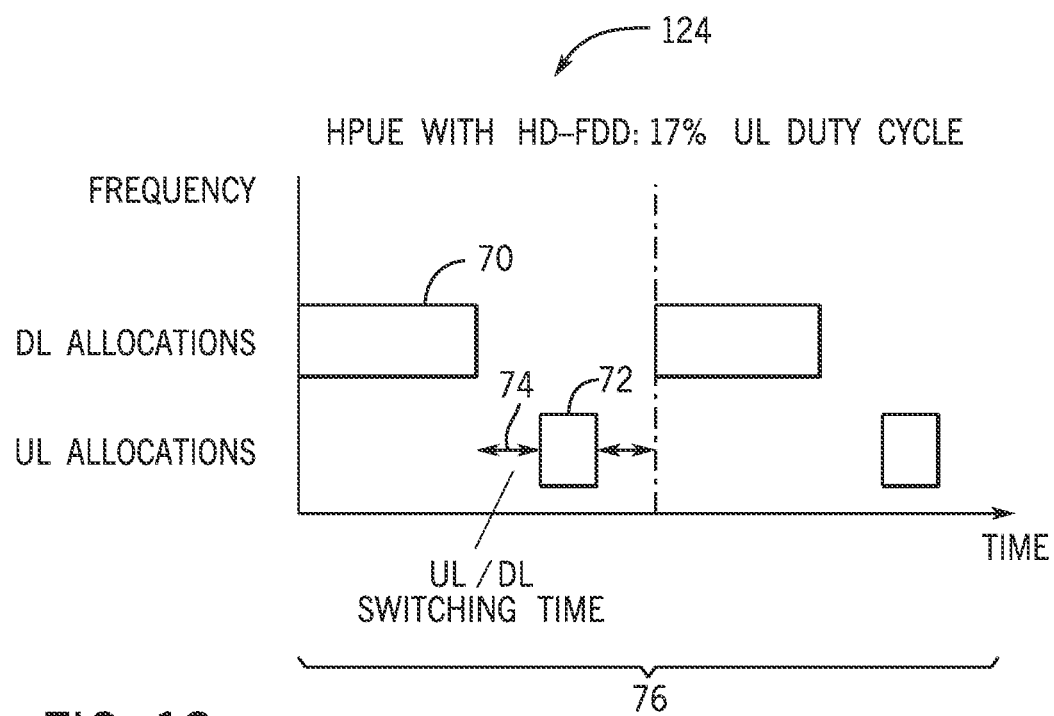
FIG. 13 is a timing diagram for performing HPUE operations using a third example uplink duty cycle, according to an embodiment of the present disclosure.

Additionally, FIG. 13 is a timing diagram 124 for performing HPUE operations based on a third example uplink duty cycle of high power operation in HD-FDD mode 76, according to an embodiment of the present disclosure. The timing diagram is similar to the above FIGS. 11 and 12, but depicts a different uplink duty cycle. For example, the user equipment 64 may transmit an indication of HPUE operation capability and a corresponding uplink duty cycle of 17% for the HPUE operation. For the 17% uplink duty cycle, the network 60 may restrict the uplink allocations 72 for the schedule to 17% of the total uplink and downlink allocations 72, 70 for the schedule. As such, the user equipment 64 may transmit using HPUE operations in HD-FDD mode 76 during the uplink allocations 72 corresponding to the schedule determined by the network 60 and the signal strength of the uplink transmissions as discussed above in FIGS. 5 and 6. It should be understood that the user equipment 64 may implement uplink duty cycles percentages of the percentages discussed above or any other suitable percentage to maintain emission levels that meet SAR regulatory requirements.

Additionally, as noted above, the greater transmission power of the HPUE operation for the user equipment 64 may result in increased temperature of a duplexer of the isolation circuit 58 of FIG. 3 during transmission. This increased temperature may lead to frequency-shifting in the duplexer when performing isolation, resulting in poor isolation performance and interference by transmission signals at the receiver 54.

Figure 14:
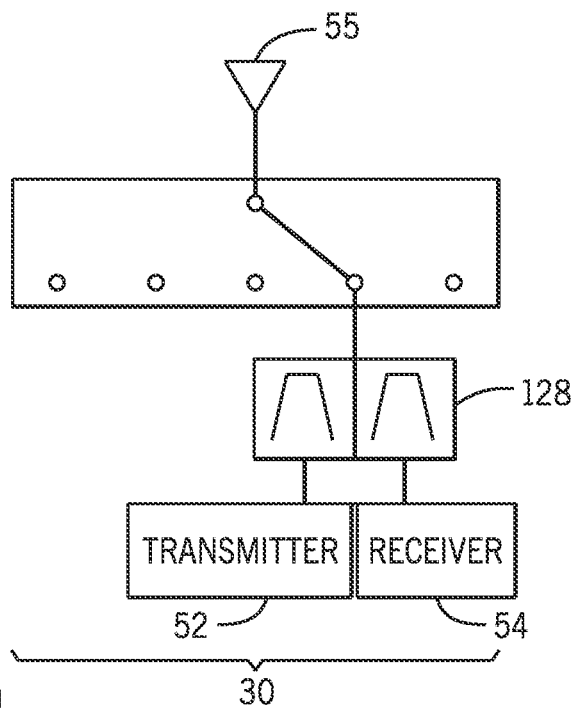
FIG. 14 is a schematic diagram of a first example of the transceiver of FIG. 3 that may perform the HPUE operations discussed herein, according to an embodiment of the present disclosure.

With the foregoing in mind, FIG. 14 is a schematic diagram of a first example of the transceiver 30 that may perform the HPUE operations discussed herein, according to an embodiment of the present disclosure. As mentioned above, the transceiver circuitry 30 of the user equipment 64 may include the duplexer (e.g., 128). The duplexer 128 may enable bidirectional communication over a single path while separating signals traveling in each direction from one another. For example, the duplexer 128 may enable frequency division duplexing (FDD), such that the duplexer may isolate the transmitter 52 of the user equipment 64 from a received signal of a first frequency band while isolating the receiver 54 of the user equipment 64 from a transmission signal of a second frequency band (e.g., isolate the transmitter from the receiver, and vice versa). In some embodiments, the duplexer 128 may include multiple variable impedance devices that isolate the transmitter 52 from a received signal and/or isolate the receiver 54 from a transmission signal. The duplexer may include an electrical balanced duplexer, a double balanced duplexer, or any other suitable form of duplexer. In some embodiments, the duplexer may also include a dual bandpass filter to allow for separate filtering operations for the transmitted and received signals.

The duplexer 128 may switch between FD-FDD mode 78 and HD-FDD mode 76 modes based on network schedules. The user equipment 64 may transmit an uplink signal by sending the signal from the transmitter 52 through the duplexer 128 to the one or more antennas 55. The user equipment 64 may also receive a downlink signal via the one or more antennas 55. The downlink signal may then pass through the duplexer 128 to the receiver 54 for processing. In some embodiments, the transceiver 30 may implement other hardware arrangements and/or architectures to mitigate thermal degradation effects.

Figure 15:
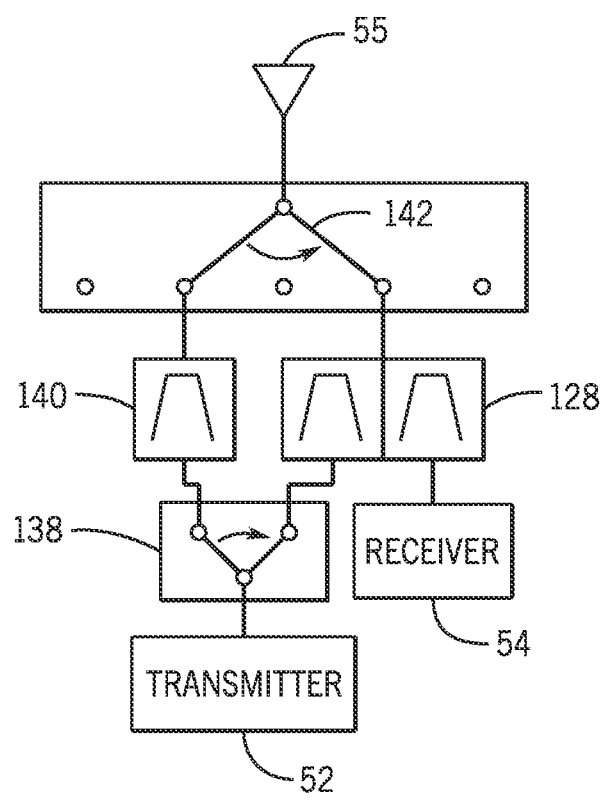
FIG. 15 is a schematic diagram of a second example of the transceiver of FIG. 3 that may perform the HPUE operations discussed herein, according to an embodiment of the present disclosure.

For example, FIG. 15 a schematic diagram of a second example of the transceiver 30 that may perform the HPUE operations discussed herein, according to an embodiment of the present disclosure. The transceiver 30 architecture may utilize multiple switches to redirect uplink transmission signals transmitted in HPUE operation in HD-FDD mode 76 from the duplexer 128 to mitigate the effects of thermal duplexer degradation that may result from the high power emissions.

The transceiver circuitry 30 may include a transmitter switch 138 (e.g., a single pole double throw (SPDT) switch) coupled to the transmitter 52 at the single input end of the transmitter switch 138. A first output of the transmitter switch 138 may be coupled to an additional bandpass filter input 140 (e.g., that may filter out signals below a desired frequency), and a second output of the transmitter switch 138 may be coupled to the duplexer 128. Additionally, an antenna switch 142 (e.g., another SPDT switch) may be coupled to the one or more antennas 55 at the single input end of the antenna switch 142. A first output of the antenna switch 142 may be coupled to the additional bandpass filter 140, and a second output of the antenna switch 142 may be coupled to the duplexer 128.

To perform HPUE operations in HD-FDD mode 76, the processor 12 may transmit a signal to the transmitter switch 138 to couple the transmitter 52 to the additional bandpass filter 140. Accordingly, the transmitter 52 may transmit an HPUE uplink signal to the additional bandpass filter 140, which may filter frequencies from the HPUE uplink signal outside of a desired transmission frequency range. As such, the HPUE uplink signal is routed via the transmitter switch 138 to bypass the duplexer 128. As a result, the duplexer 128 may not suffer thermal degradation effects due to the HPUE uplink signal. The processor 12 may transmit an additional signal to the antenna switch 142 to couple the bandpass filter 140 to the one or more antennas 55. This enables the HPUE uplink signal to pass from the bandpass filter 140 to the one or more antennas 55 for transmission. In default power operations, the processor 12 of the user equipment 64 may send a signal to the transmitter switch 138 to couple the transmitter circuitry 52 to the duplexer 128 and send an additional signal to the antenna switch 142 to couple the duplexer 128 to the one or more antennas 55. This enables the user equipment 64 to utilize the duplexer 128 during default power operations. The transceiver circuitry 30 may also utilize additional or alternative hardware components and/or architecture to enable the HPUE uplink signal to bypass the duplexer 128.

Figure 16:
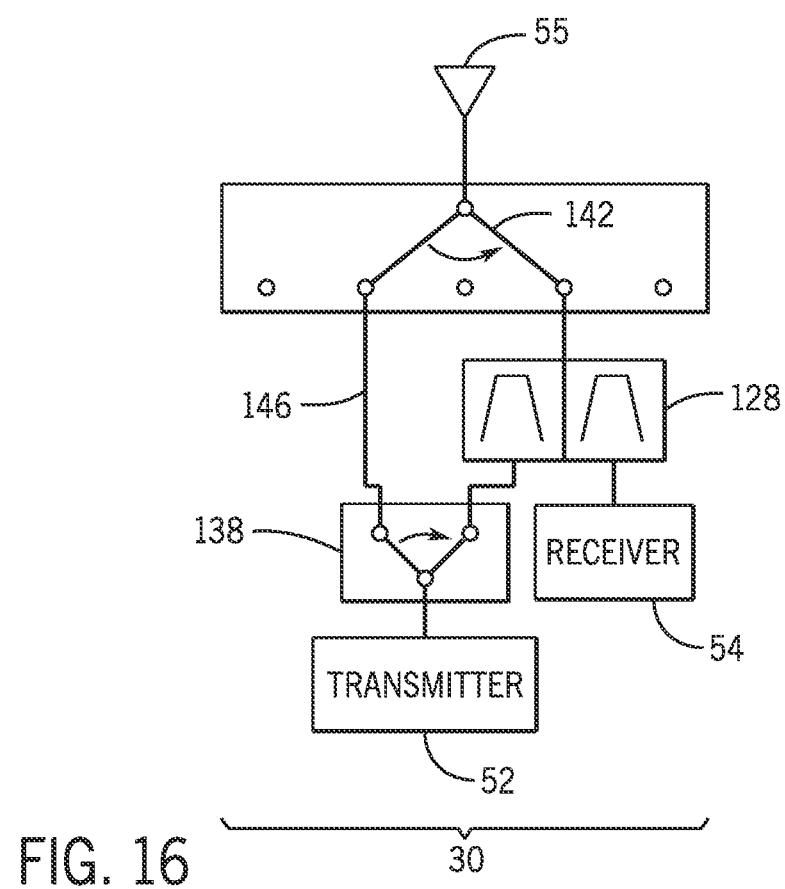
FIG. 16 is a schematic diagram of a third example of the transceiver of FIG. 3 that may perform the HPUE operations discussed herein, according to an embodiment of the present disclosure.

With the foregoing in mind, FIG. 16 a schematic diagram of a third example of the transceiver 30 that may perform the HPUE operations discussed herein, according to an embodiment of the present disclosure. The transceiver 30 architecture may utilize multiple switches to redirect uplink transmission signals transmitted in HPUE operation in HD-FDD mode 76 from the duplexer 128 to mitigate the effects of thermal duplexer degradation that may result from the high power emissions.

The transceiver circuitry 30 may include a transmitter switch 138 (e.g., a single pole double throw (SPDT) switch) coupled to the transmitter 52 at the single input end of the transmitter switch 138. A first output of the transmitter switch 138 may be coupled to a first output 146 of the antenna switch 142 (e.g., another SPDT switch), and a second output of the transmitter switch 138 may be coupled to the duplexer 128. Additionally, the antenna switch 142 may be coupled to the one or more antennas 55 at the single input end of the antenna switch 142. The first output 146 of the antenna switch 142 may be coupled to the transmitter 52 as discussed above, and a second output of the antenna switch 142 may be coupled to the duplexer 128.

To perform HPUE operations in HD-FDD mode 76, the processor 12 may transmit a signal to the transmitter switch 138 to couple the transmitter 52 to the first output 146 of the antenna switch 142. Accordingly, the transmitter 52 may transmit an HPUE uplink signal to the first output 146 of the antenna switch 142. As such, the HPUE uplink signal is routed via the transmitter switch 138 to bypass the duplexer 128. As a result, the duplexer 128 may not suffer thermal degradation effects due to the HPUE uplink signal. The processor 12 may transmit an additional signal to the antenna switch 142 to couple the transmitter 52 output to the one or more antennas 55. This enables the HPUE uplink signal to pass from the transmitter 52 directly to the one or more antennas 55 for transmission. In such cases, it may be that the HPUE uplink signal is relatively free from noise or emissions outside of a desired transmission frequency range (e.g., of a transmission channel), such that a filter (such as the additional bandpass filter 140) may be unnecessary.

In default power operations, the processor 12 of the user equipment 64 may send a signal to the transmitter switch 138 to couple the transmitter circuitry 52 to the duplexer 128 and send an additional signal to the antenna switch 142 to couple the duplexer 128 to the one or more antennas 55. This enables the user equipment 64 to utilize the duplexer 128 during default power operations. The transceiver circuitry 30 may also utilize additional or alternative hardware components and/or architecture to enable the HPUE uplink signal to bypass the duplexer 128.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A base station, comprising:
a transmitter configured to transmit data;
a receiver configured to receive data; and
one or more processors configured to
cause the transmitter to send a first indication to cause a user equipment to operate at a first power level at a first time and a second power level at a second time, wherein the first power level is less than or equal to a first threshold value and the second power level is greater than the first threshold value;
receive a second indication from the user equipment via the receiver indicating that the user equipment is capable of transmitting data using the second power level,
receive a third indication that a signal strength associated with the user equipment is below a second threshold value, and
schedule an uplink allocation and a downlink allocation that corresponds to the second power level based on a first frequency of the uplink allocation and a second frequency of the downlink allocation, wherein the uplink allocation is restricted to a time slot where the downlink allocation is not scheduled, and
cause the transmitter to send a fourth indication to the user equipment to transmit data using the second power level in a half-duplex frequency division duplex (HD-FDD) mode based on the scheduled uplink allocation and downlink allocation and the second indication.

2. The base station of claim 1, wherein the one or more processors are configured to schedule a time period for the user equipment to be reconfigured to transmit using the second power level in the HD-FDD mode, the fourth indication to the user equipment indicating the time period.

3. The base station of claim 1, wherein the first threshold value is 23 decibel milliwatts.

4. The base station of claim 1, wherein the one or more processors are configured to cause the transmitter to send a fifth indication to the user equipment to transmit data using the first power level in a full-duplex frequency division duplex (FD-FDD) mode based on receiving a sixth indication that the signal strength associated with the user equipment is above the second threshold value.

5. The base station of claim 4, wherein the first power level is less than or equal to 23 decibel milliwatts.

6. The base station of claim 1, wherein the second indication is associated with an uplink duty cycle of the user equipment, and wherein the one or more processors are configured to determine a schedule to indicate one or more time periods for the user equipment to transmit data and receive data using the HD-FDD mode based on the uplink duty cycle.

7. The base station of claim 1, wherein the second power level above the first threshold value corresponds to power class 2.

8. The base station of claim 1, wherein the second indication is sent based on a power headroom of the user equipment being less than a negative threshold.

9. A user equipment, comprising:
a transmitter configured to operate at a first power level at a first time and a second power level at a second time, wherein the first power level is less than or equal to a first threshold value and the second power level is greater than the first threshold value;
a receiver configured to receive a reception signal; and
one or more processors configured to
cause the transmitter to send a notification to a network indicating that the user equipment is capable of transmitting a transmission signal using the second power level,
receive a first indication from the network via the receiver to cause the transmitter to operate according to a schedule for performing an uplink allocation and a downlink allocation that corresponds to the second power level based on a first frequency of the uplink allocation and a second frequency of the downlink allocation, wherein the uplink allocation is restricted to a time slot where the downlink allocation is not scheduled;
receive a second indication from the network via the receiver to reconfigure the transmitter to use the second power level in a half-duplex frequency division duplex (HD-FDD) mode,
reconfigure the transmitter to use the second power level in the HD-FDD mode based on the first indication and the second indication,
receive a third indication from the network via the receiver to reconfigure the transmitter to use the first power level in a full-duplex frequency division duplex (FD-FDD) mode, and
reconfigure the transmitter to use the first power level in the FD-FDD mode based on the third indication.

10. The user equipment of claim 9, comprising
one or more antennas being communicatively coupled to the transmitter and the receiver,
a duplexer configured to isolate the receiver from the transmission signal and to isolate the transmitter from the reception signal, and
a bandpass filter configured to enable at least a portion of the transmission signal that is within a frequency range to pass from the transmitter to the one or more antennas.

11. The user equipment of claim 10, comprising a switch that enables the transmitter to be coupled to the duplexer in a first configuration and the bandpass filter in a second configuration.

12. The user equipment of claim 11, wherein the one or more processors are configured to send a signal to the switch to couple the transmitter to the bandpass filter in the second configuration based on the second indication.

13. The user equipment of claim 11, wherein the one or more processors are configured to send a signal to the switch to couple the transmitter to the duplexer in the first configuration based on the third indication.

14. The user equipment of claim 10, comprising a switch that enables the one or more antennas to be coupled to the duplexer in a first configuration or the bandpass filter in a second configuration.

15. The user equipment of claim 14, wherein the one or more processors are configured to send a signal to the switch to couple the bandpass filter to the one or more antennas in the second configuration based on the second indication.

16. The user equipment of claim 14, wherein the one or more processors are configured to send a signal to the switch to couple the duplexer to the one or more antennas in the first configuration based on the third indication.

17. The user equipment of claim 9, wherein the one or more processors are configured to cause the transmitter to transmit at the first time after reconfiguring the transmitter to use the first power level in the FD-FDD mode, and cause the transmitter to transmit at the second time after reconfiguring the transmitter to use the second power level in the HD-FDD mode.

18. A method comprising:
generating, using processor circuitry associated with a user equipment, a notification to a network that the user equipment is capable of transmitting at a first power level at a first time and a second power level at a second time, wherein the first power level is less than or equal to a threshold value and the second power level is greater than the threshold value, and generating data for transmission using the second power level above the threshold value;
receiving, by the processor circuitry, a first indication from the network to transmit according to a schedule for performing an uplink allocation and a downlink allocation that corresponds to the second power level based on a first frequency of the uplink allocation and a second frequency of the downlink allocation, wherein the uplink allocation is restricted to a time slot where the downlink allocation is not scheduled;
receiving, by the processor circuitry, a second indication from the network to transmit using the second power level in a half-duplex frequency division duplex (HD-FDD) mode;
generating first data to be transmitted from the user equipment using the second power level in the HD-FDD mode based on the first indication and the second indication;
receiving, by the processor circuitry, a third indication from the network to transmit using the first power level below the threshold value in a full-duplex frequency division duplex (FD-FDD) mode; and
generating second data to be transmitted from the user equipment using the first power level in the FD-FDD mode based on the third indication.

19. The method of claim 18, wherein the notification comprises a duty cycle that indicates one or more time periods for the user equipment to transmit data using the second power level in the HD-FDD mode.

20. The method of claim 19, wherein the second indication from the network to transmit using the second power level in the HD-FDD mode is determined based on the duty cycle.

* * * * *